US011595153B2

United States Patent
Muraoka et al.

(10) Patent No.: US 11,595,153 B2
(45) Date of Patent: Feb. 28, 2023

(54) RECEIVER APPARATUS, AND METHOD FOR PRODUCING PARAMETERS FOR DEMODULATION

(71) Applicants: NEC CORPORATION, Tokyo (JP); OSAKA UNIVERSITY, Osaka (JP); THE DOSHISHA, Kyoto (JP)

(72) Inventors: Kazushi Muraoka, Tokyo (JP); Takanobu Doi, Tokyo (JP); Naoto Ishii, Tokyo (JP); Takumi Takahashi, Osaka (JP); Seiichi Sampei, Osaka (JP); Shinsuke Ibi, Kyoto (JP)

(73) Assignees: NEC CORPORATION, Tokyo (JP); OSAKA UNIVERSITY, Osaka (JP); THE DOSHISHA, Kyoto (JP)

( * ) Notice: Subject to any disclaimer, the term of this patent is extended or adjusted under 35 U.S.C. 154(b) by 0 days.

(21) Appl. No.: 17/673,093

(22) Filed: Feb. 16, 2022

(65) Prior Publication Data
US 2022/0337341 A1 Oct. 20, 2022

(30) Foreign Application Priority Data

Apr. 14, 2021 (JP) .............................. JP2021-068403

(51) Int. Cl.
*H04L 1/00* (2006.01)
*H04B 7/0452* (2017.01)

(52) U.S. Cl.
CPC ......... *H04L 1/0045* (2013.01); *H04B 7/0452* (2013.01)

(58) Field of Classification Search
CPC ........................... H04L 1/0045; H04B 7/0452
See application file for complete search history.

(56) References Cited

U.S. PATENT DOCUMENTS

| | | | |
|---|---|---|---|
| 2005/0007091 A1* | 1/2005 | Makeig .................. | G06K 9/624 |
| | | | 324/76.13 |
| 2020/0051225 A1* | 2/2020 | Barron ...................... | G06T 7/90 |
| 2020/0408864 A1* | 12/2020 | Mailhe .................... | G06T 15/08 |
| 2022/0067569 A1* | 3/2022 | Maas ..................... | G06F 16/285 |
| 2022/0182178 A1* | 6/2022 | Wei ........................ | G06N 3/088 |

OTHER PUBLICATIONS

D. Shirase, et al. "A Study on Deep Unfolding-aided Gaussian Belief Propagation for Correlated Large MIMO Signal Detection," Jul. 2020, IEICE Technical Report vol. 120 No. 87.
J. Tachibana, et al., "Learning and Analysis of Damping Factor in Massive MIMO Detection using BP Algorithm with Node Selection," May 2020, IEICE Technical Report vol. 120 No. 29.
N. Kamiya, "Learning-Based Signal Detection for Wireless OAM-MIMO Systems With Uniform Circular Array Antennas," Dec. 2020, IEEE Access vol. 8, pp. 219344-219354.

* cited by examiner

*Primary Examiner* — Vineeta S Panwalkar
(74) *Attorney, Agent, or Firm* — Sughrue Mion, PLLC

(57) ABSTRACT

A method implemented in a computer system includes training a network, which is obtained by unfolding an iterative algorithm for demodulation or demodulation and decoding, using a machine learning technique with a loss function that takes into account non-Gaussianity of a log-likelihood ratio (LLR) distribution calculated from an output of the network. The method further includes producing a first set of learned parameters of that iterative algorithm.

20 Claims, 12 Drawing Sheets

450

| MCS | PARAMETER SET |
|---|---|
| 1 | $(a_1^{(1)}, \eta_1^{(1)}), (a_1^{(2)}, \eta_1^{(2)}), \cdots (a_1^{(T)}, \eta_1^{(T)})$ |
| 2 | $(a_2^{(1)}, \eta_2^{(1)}), (a_2^{(2)}, \eta_2^{(2)}), \cdots (a_2^{(T)}, \eta_2^{(T)})$ |
| ⋮ | |
| 28 | $(a_{28}^{(1)}, \eta_{28}^{(1)}), (a_{28}^{(2)}, \eta_{28}^{(2)}), \cdots (a_{28}^{(T)}, \eta_{28}^{(T)})$ |

Fig. 8

RECEIVER APPARATUS, AND METHOD FOR PRODUCING PARAMETERS FOR DEMODULATION

INCORPORATION BY REFERENCE

This application is based upon and claims the benefit of priority from Japanese patent application No. 2021-068403, filed on Apr. 14, 2021, the disclosure of which is incorporated herein in its entirety by reference.

TECHNICAL FIELD

The present disclosure relates to a radio communication system, and in particular, to received signal processing.

BACKGROUND ART

Belief Propagation (BP) algorithms can be used for signal detection (e.g., demodulation and decoding). For example, BP algorithms may be used for signal detection in Multi-Input Multi-Output (MIMO) receivers.

Signal processing using a BP algorithm can be optimized using machine learning (or deep learning). This method unfolds the iterations of the BP algorithm into a layer-wise structure, similar to a neural network, and introduces a large number of trainable parameters. Such a method is called deep unfolding. Non Patent Literature 1 and 2 propose techniques to tune a number of parameters of a BP algorithm for large-scale (or massive) MIMO detection by machine learning, thereby improving the convergence characteristics of the BP algorithm. Meanwhile, Non-patent document 3 proposes a method to remove inter-mode interference in OAM multiplex transmission systems using Orbital Angular Momentum (OAM) by using an iterative demodulation algorithm called Alternating Direction Method of Multipliers (ADMM) and adjusting the parameters of the algorithm by machine learning.

Non-Patent Literature

Non-Patent Literature 1: D. Shirase, T. Takahashi, S. Ibi, K. Muraoka, N. Ishii, and S. Sampei, "A Study on Deep Unfolding-aided Gaussian Belief Propagation for Correlated Large MIMO Signal Detection," IEICE Technical Report Volume 120 Number 87, pp. 25-30, July 2020

Non-Patent Literature 2: J. Tachibana and T. Ohtsuki, "Learning and Analysis of Damping Factor in Massive MIMO Detection using BP Algorithm with Node Selection," IEICE Technical Report Volume 120 Number 29, pp. 49-54, May 2020

Non-Patent Literature 3: N. Kamiya, "Learning-Based Signal Detection for Wireless OAM-MIMO Systems With Uniform Circular Array Antennas," IEEE Access Volume 8, pp. 219344-219354, December 2020

SUMMARY

In general, machine-learning-based iterative demodulation algorithms (e.g., Gaussian BP algorithm) are optimized with a loss function that considers mean square error (MSE) or binary cross entropy (BCE). When an MSE loss function is used, a number of parameters of an iterative demodulation algorithm is adjusted so as to minimize an error between the output of a demodulator (i.e., the iterative demodulation algorithm) and training data (i.e., transmitted modulated symbols). On the other hand, when a BCE loss function is used, the parameters are adjusted so as to maximize mutual information of a log likelihood ratio (LLR) obtained from the output of the demodulator (i.e., the iterative demodulation algorithm).

However, a typical radio communication system uses forward error correction (FEC), and the error correction process is performed at the receiver based on the demodulator output. In other words, the final decision of the information bits is not based on the demodulator output, but on the decoder output. It should be noted here that minimizing the bit error rate (BER) of the demodulator output does not necessarily result in minimizing the BER of the decoder output. Error correcting codes used in radio communication systems (e.g., low-density parity-check (LDPC) codes, Reed-Solomon (RS) codes, Viterbi codes, Turbo codes) are usually optimized or designed for transmission over additive white Gaussian noise (AWGN) channels. Accordingly, the demodulator can provide its maximum error correction capability when the noise component of the LLR of the demodulator output follows a Gaussian distribution.

In view of the above, there is a problem that learning using a loss function based on an MSE metric or BCE metric of the demodulator output does not necessarily minimize the BER of the demodulator output.

One of the objects to be attained by embodiments disclosed herein is to provide an apparatus, a method, and a program that contribute to improving a bit error rate of a decoder output of a receiver implementing a machine learning-based iterative demodulation algorithm. It should be noted that this object is merely one of the objects to be attained by the embodiments disclosed herein. Other objects or problems and novel features will be made apparent from the following description and the accompanying drawings.

In a first aspect, a method implemented in a computer system includes the following steps:
(a) training a network, which is obtained by unfolding an iterative algorithm for demodulation or demodulation and decoding, using a machine learning technique with a first loss function that takes into account non-Gaussianity of an LLR distribution calculated from an output of the network; and
(b) producing, by the training, a first set of learned parameters of the iterative algorithm.

In a second aspect, a receiver apparatus includes a memory and at least one processor. The memory stores one or more sets of learned parameters produced by a method according to the first aspect. The at least one processor is configured to perform on a plurality of received signals an iterative algorithm that uses any of the one or more sets of learned parameters, and generate a plurality of LLR vectors corresponding to a plurality of transmitted symbols. The at least one processor is further configured to perform error correction decoding using the plurality of LLR vectors to generate a plurality of decoded bit sequences.

In a third aspect, a receiver apparatus includes a memory and at least one processor coupled to the memory. The at least one processor is configured to perform on a plurality of received signals an iterative algorithm that uses a first set of learned parameters, and generate a plurality of LLR vectors corresponding to a plurality of transmitted symbols. Herein, the first set of learned parameters is a parameter set generated by training a network, which is obtained by unfolding the iterative algorithm, using a machine learning technique with a first loss function that takes into account non-Gaussianity of an LLR distribution calculated from an output of the network. The at least one processor is further configured to perform error correction decoding using the plurality of LLR vectors to generate a plurality of decoded bit sequences.

In a fourth aspect, a method performed by a receiver apparatus includes: (a) performing on a plurality of received signals an iterative algorithm that uses a first set of learned parameters, and generating a plurality of LLR vectors corresponding to a plurality of transmitted symbols; and (b) performing error correction decoding using the plurality of LLR vectors to generate a plurality of decoded bit sequences. The first set of learned parameters is a parameter set generated by training a network, which is obtained by unfolding the iterative algorithm, using a machine learning technique with a first loss function that takes into account non-Gaussianity of an LLR distribution calculated from an output of the network.

In a fifth aspect, a program includes instructions (software codes) that, when loaded into a computer, cause the computer to perform the method according to the above-described first aspect.

In a sixth aspect, a program includes instructions (software codes) that, when loaded into a computer, cause the computer to perform the method according to the above-described fourth aspect.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 8 is a diagram showing one example of a parameter set according to an example embodiment;

EXAMPLE EMBODIMENT

Figure 1:
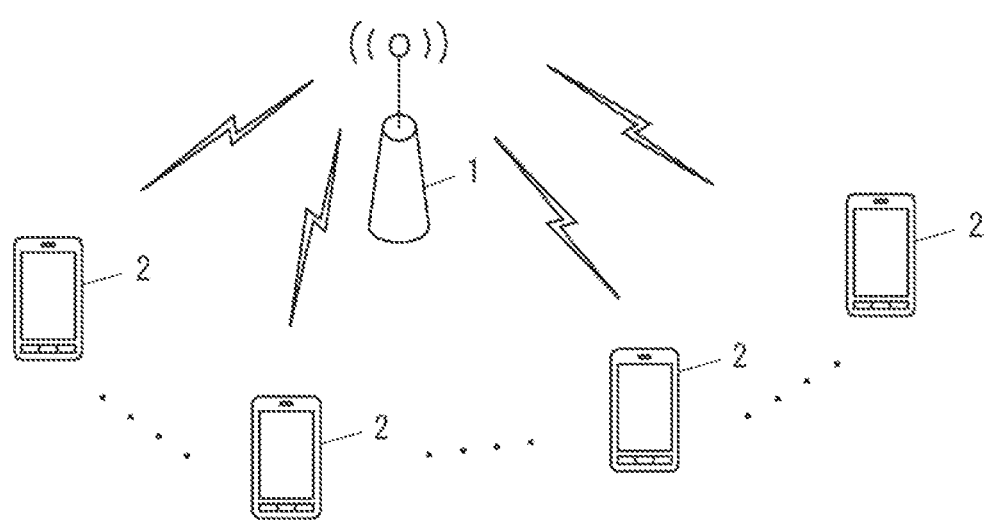
FIG. 1 is a diagram showing a radio communication system according to an example embodiment.

Specific example embodiments will be described hereinafter in detail with reference to the drawings. The same or corresponding elements are denoted by the same symbols throughout the drawings, and duplicated explanations are omitted as necessary for the sake of clarity.

The embodiments presented below are described primarily for a massive multi-user MIMO receiver. However, these embodiments may be applied to other receivers that implement machine learning-based iterative demodulation algorithms. For example, the following embodiments may be applied to receivers in point-to-point MIMO systems or Line of Sight (LOS) MIMO systems. The following embodiments may be applied to multi-user detection using an iterative algorithm in Non-Orthogonal Multiple Access (NOMA) systems. The following embodiments may be applied to receivers in optical MIMO systems. An optical MIMO system can be said to be a space-division multiplexing transmission system using a multimode optical fiber or multicore optical fiber. As an example and not by way of limitation, the machine learning based iterative demodulation algorithms may be the BP algorithms described in the following embodiments. However, these embodiments may use other machine learning-based iterative demodulation algorithms (e.g., alternating direction multiplier method).

As an example and not by way of limitation, the following embodiments describe a receiver architecture in which information bits are decided after the demodulation process by a demodulator and the decoding process by a decoder. Alternatively, in the case of a communication system with double error correcting encoding, a receiver architecture may be employed in which the demodulation process is followed by the first and second decoding processes. In that case, the iterative (demodulation) algorithm may perform the demodulation process and the first decoding process. In other words, the receiver architecture described in the following embodiments may be replaced by a receiver architecture in which the iterative (demodulation) algorithm for the demodulation and first decoding is followed by the second decoding. More alternatively, the receiver architecture described in the following embodiments can be replaced by an Iterative Detection and Decoding type receiver architecture. This may also be referred to as joint iterative demodulation and decoding. An iterative demodulation and decoding receiver feeds back information about code bits obtained by the decoder (or demodulation process, demodulation step) as a priori information to the demodulator (or demodulation process, demodulation step) and repeats an iterative loop involving demodulation and decoding. An iterative demodulation and decoding receiver may perform multiple iterative algorithms (or multiple iterative loops). Specifically, an iterative demodulation and decoding receiver may include an outer iterative loop between demodulation (e.g., MIMO detection) and decoding (e.g., LDPC decoding or Turbo decoding) and an inner iterative loop within the demodulation process. In addition, as readily understood by those skilled in the art, the inner iteration loop may include a portion of the decoding process (e.g., the first decoding process). The method for producing parameters using machine learning described in the following embodiments may be used to produce a parameter set for the inner iterative loop by machine learning, or may be used to produce parameter sets for the outer and inner iterative loops simultaneously by machine learning.

That is, the terms "iterative demodulation algorithm" and "iterative algorithm" as used herein refer to an iterative algorithm that is used for at least demodulation and may be used for demodulation and (part of) decoding. The term "demodulation" as used herein may be called, for example, soft demodulation, signal detection, detection, soft detection, demapping, or soft demapping. The following embodiments may be broadly applicable to receiver architectures in which a decoding process (or a second decoding process) is placed in a later stage of an iterative demodulation algorithm.

First Example Embodiment

FIG. 1 shows a configuration example of a radio communication system (i.e., multiple access cellular system) according to this example embodiment. Referring to FIG. 1, a base station 1 provides wireless access for a plurality of radio terminals 2. The base station 1 may be referred to as an access point, a transmission/reception point (TRP), or other names. The base station 1 may be, for example, a gNB or a gNB Distributed Unit (gNB-DU) of a 5G system. In some implementations, the radio communication system may use a multi-user MIMO technique for uplink transmissions from the plurality of radio terminals 2 to the base station 1. In this case, the base station 1 may receive reference signals from the radio terminals 2, estimate a MIMO channel between the radio terminals 2 and the base station 1 using the received reference signals, receive data signals from the radio terminals 2, and detect transmitted signals using the estimated channel. In other words, the base station 1 may perform MIMO detection in order to separate the multi-user signals of the multiple radio terminals 2.

Figure 2:
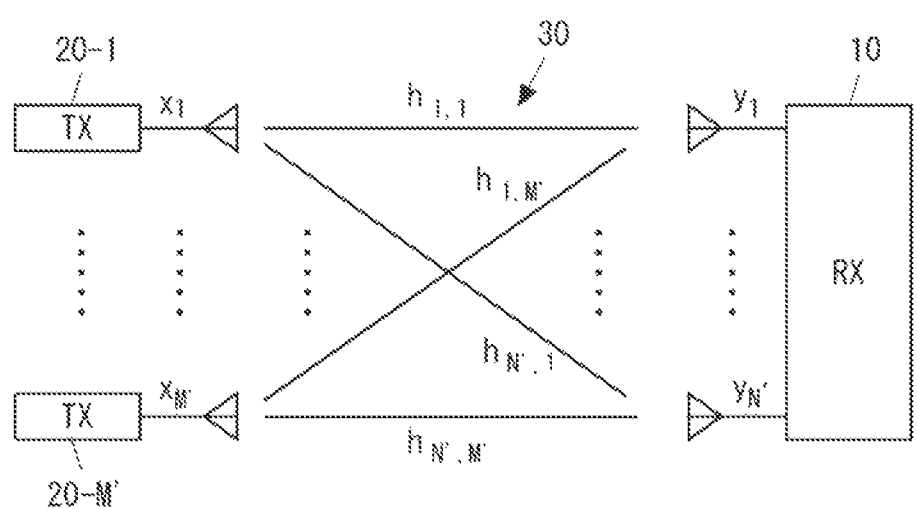
FIG. 2 is a diagram showing a system model according to an example embodiment.

FIG. 2 shows one example of a system model of uplink multi-user MIMO transmission. In FIG. 2, transmitters 20 of the respective radio terminals 2 communicate with a receiver 10 of the base station 1 through a channel (propagation path) 30. In the example shown in FIG. 2, each of the M' transmitters 20 includes one transmitting antenna. Alternatively, each of the transmitters 20 may include two or more transmitting antennas. The receiver 10 of the base station 1 includes N' receiving antennas. It is assumed that the total number of transmitting antennas, M', is equal to or smaller than the total number of receiving antennas, N'.

In the following description, for the sake of simplicity, it is assumed that the transmitted signal from each radio terminal 2 (or each user) is a single carrier transmitted signal and the propagation path between each radio terminal 2 and the base station 1 is a flat-fading channel. Incidentally, in a multipath-fading environment where the transmitted signal from each user uses Orthogonal Frequency Division Multiplexing (OFDM), Single Carrier-Frequency Division Multiple Access (SC-FDMA) or the like, it may also be assumed that the propagation path of each subcarrier is a flat-fading channel by inserting a cyclic prefix having an appropriate length into the transmitted signal. Accordingly, this example embodiment may be applied to OFDM and SC-FDMA.

Quadrature amplitude modulation (QAM) modulated transmitted signals are transmitted from the M' transmitting antennas of the plurality of radio terminals 2 and received by the base station 1 equipped with the N' receiving antennas. In this case, using the equivalent low-pass representation, a complex valued signal model can be expressed by the following equation:

$$y^c = H^c x^c + z^c \quad (1)$$

where $y^c$ is an N'×1 (i.e., N' rows and one column) complex received signal vector, $H^c$ is an N'×M' complex MIMO channel matrix, $z^c$ is an N'×1 complex noise vector, and $x^c$ is an M'×1 complex transmitted signal vector.

Denoting the number of the QAM modulation symbols as Q', Q' is equal to 4 in Quadrature Phase shift Keying (QPSK), while Q' is equal to 16 in 16QAM. It is assumed that the amplitude of the modulation symbol of each of the I axis and the Q axis is {+c,−c} in QPSK and it is {+c,−c,+3c,−3c} in 16QAM. The value c can be expressed by the following equation:

$$c = \sqrt{\frac{3E_s}{2(Q'-1)}} \quad (2)$$

where $E_s$ is average signal power. The power of complex noise in each of the receiving antennas is denoted by $N_0$.

For the sake of simplicity, a received signal model, obtained by replacing the equivalent low-pass complex representation with an equivalent real-valued signal model y, can be expressed by the following equations:

$$y = Hx + z \quad (3)$$

$$y = \begin{bmatrix} \Re(y^c) \\ \Im(y^c) \end{bmatrix} \quad (4)$$

$$x = \begin{bmatrix} \Re(x^c) \\ \Im(x^c) \end{bmatrix} \quad (5)$$

$$z = \begin{bmatrix} \Re(z^c) \\ \Im(z^c) \end{bmatrix} \quad (6)$$

$$H = \begin{bmatrix} \Re(H^c) & -\Im(H^c) \\ \Im(H^c) & \Re(H^c) \end{bmatrix} \quad (7)$$

where y is an N×1 equivalent real-valued received signal vector, H is an N×M equivalent real-valued MIMO channel matrix, z is an N×1 equivalent real-valued noise vector, and x is an M×1 equivalent real-valued transmitted signal vector. The value N is equal to 2N', while the value M is equal to 2M'. Each transmitted signal is equivalent to a Pulse Amplitude Modulation (PAM) modulated symbol having the number of the modulation symbols Q equal to $\sqrt{Q'}$ (i.e., square root of Q'), while the average signal power is $E_s/2$. Further, noise power included in each element of the noise vector z is $N_0/2$. The following provides a description of reception processing using the equivalent real-valued model.

Figure 3:
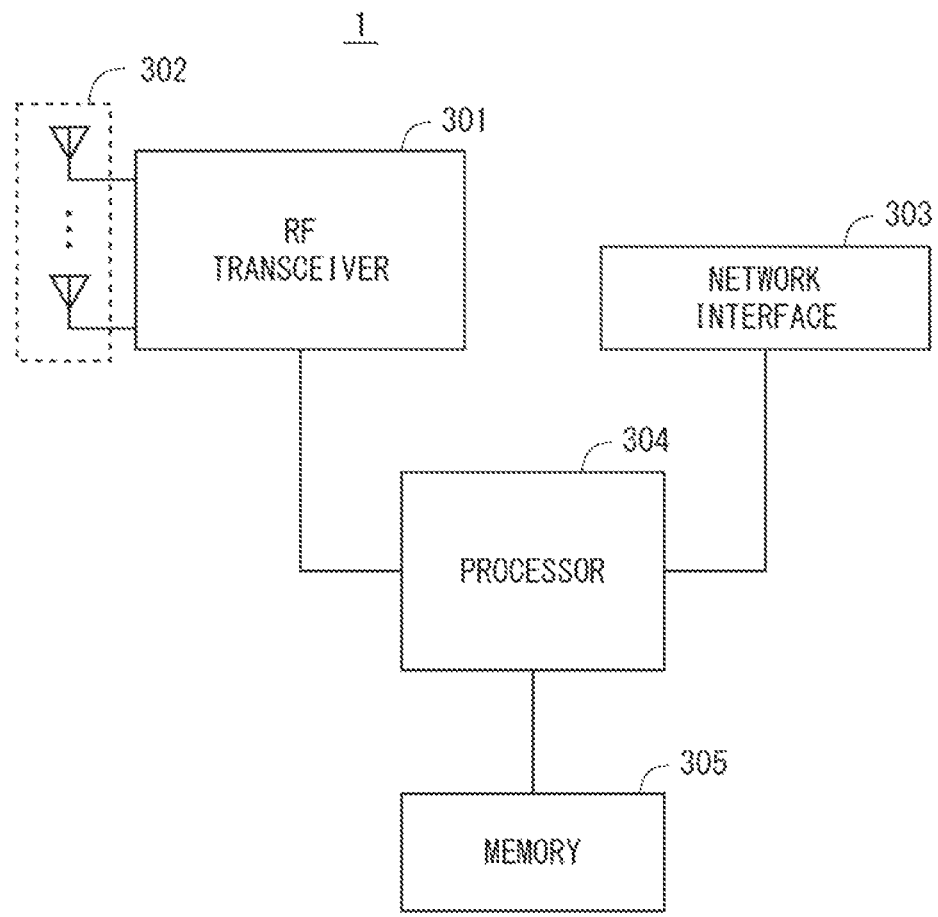
FIG. 3 is a diagram showing a configuration example of a base station according to an example embodiment.

FIG. 3 shows a configuration example of the base station 1. Referring to FIG. 3, the base station 1 includes a Radio Frequency (RF) transceiver 301, a network interface 303, a processor 304, and a memory 305. The RF transceiver 301 performs analog RF signal processing in order to communicate with the radio terminals 2. The RF transceiver 301 may include a plurality of transceivers. The RF transceiver 301 is coupled to an antenna array 302 and the processor 304. The RF transceiver 301 receives modulated symbol data from the processor 304, generates a transmission RF signal, and supplies the transmission RF signal to the antenna array 302. Further, the RF transceiver 301 generates a baseband received signal based on a received RF signal received by the antenna array 302 and supplies the baseband received signal to the processor 304. The RF transceiver 301 may include an analog beamformer circuit for beam forming. The analog beamformer circuit includes, for example, a plurality of phase shifters and a plurality of power amplifiers.

The network interface 303 is used to communicate with network nodes (e.g., another base station and a core network node). The network interface 303 may include, for example, a network interface card (NIC) conforming to the IEEE 802.3 series.

The processor 304 performs digital baseband signal processing (i.e., data-plane processing) and control-plane processing for radio communication. The processor 304 may include a plurality of processors. The processor 304 may include, for example, a modem processor (e.g., a Central Processing Unit (CPU), a graphics processing unit (GPU), or a Digital Signal Processor (DSP)) that performs digital baseband signal processing and a protocol stack processor (e.g., a Central Processing Unit (CPU) or a Micro Processing Unit (MPU)) that performs the control-plane processing.

The digital baseband signal processing by the processor 304 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the processor 304 may include processing of Non-Access Stratum (NAS) messages, Radio Resource Control (RRC) messages, Medium Access Control (MAC) Control Elements (CEs), and Downlink Control Information (DCI).

The processor 304 may include a digital beamformer module for beam forming. The digital beamformer module may include a MIMO encoder and a pre-coder.

The memory 305 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 305 may include a storage located apart from the processor 304. In this case, the processor 304 may access the memory 305 via the network interface 303 or another I/O interface.

The memory 305 may include a computer readable medium storing one or more software modules (computer programs) including instructions and data to perform at least a part of processing by the base station 1. In some implementations, the processor 304 may be configured to load the software modules from the memory 305 and execute the loaded software modules, thereby performing at least a part of the processing by the base station 1.

Figure 4:
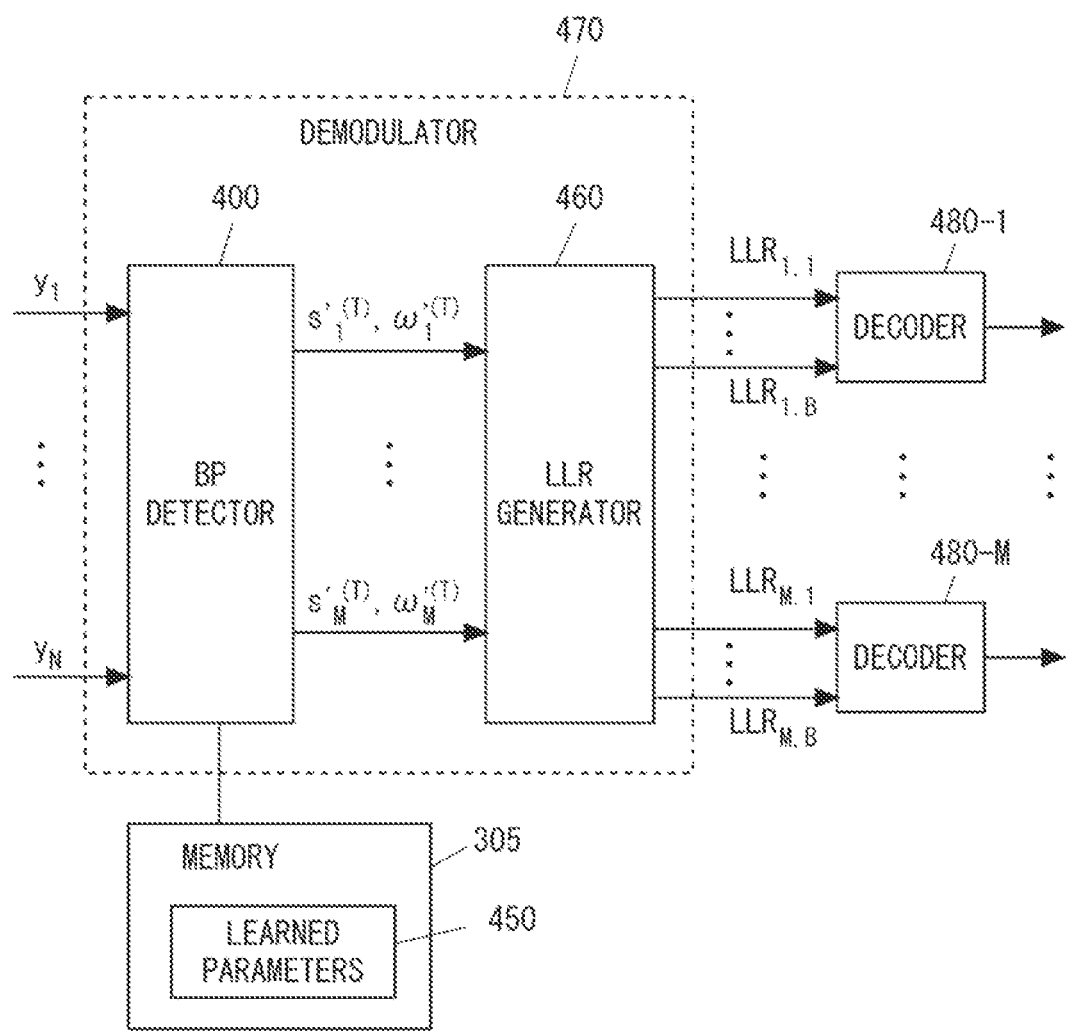
FIG. 4 is a diagram showing a configuration example of a processor of a base station according to an example embodiment.

According to this example embodiment, the processor 304 causes the base station 1 to perform received signal processing (i.e., demodulation and decoding) for multi-user detection (MIMO detection). For this purpose, the processor 304 may include a demodulator 470 and one or more decoders 480 (480-1, . . . 480-M) as shown in FIG. 4.

The demodulator 470 includes a BP detector 400 and an LLR generator 460. The BP detector 400 receives N received signals, $y_1$ to $y_N$, obtained by the N' receiving antennas and executes an iterative BP algorithm with the total number of iterations T in order to perform multi-user detection (step 501 in FIG. 5). The BP detector 400 then provides estimated values, $s'^{(T)}_1$ to $s'^{(T)}_M$, of the separated M transmitted signal (or transmitted symbol) components and equivalent gains, $\omega'^{(T)}_1$ to $\omega'^{(T)}_M$, to the LLR generator 460. The LLR generator 460 generates M LLR vectors corresponding to the M transmitted symbols (step 502 in FIG. 5). Each LLR vector indicates LLR values ($LLR_{m,1} \ldots LLR_{m,B}$) of the code bits mapped to each transmitted symbol. The number of code bit LLR values, B, is equal to the number of bits contained in a single transmitted symbol. For example, if 16QAM is used as the complex modulation symbol, the number of bits per symbol is 4, and thus in the equivalent real-valued model, B is equal to 2.

Figure 5:
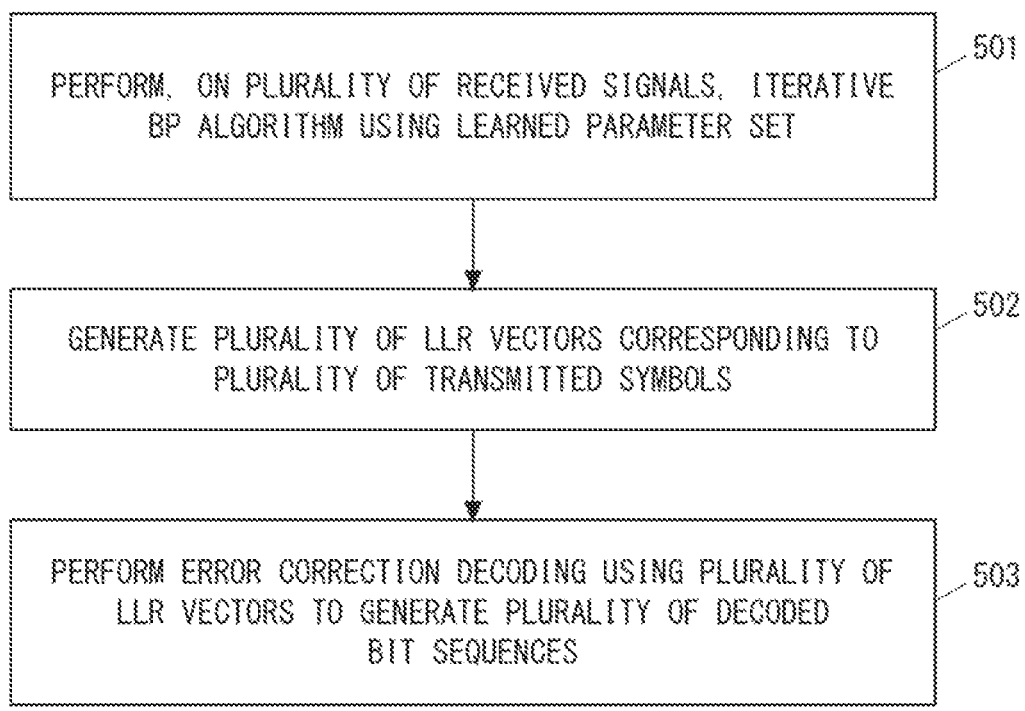
FIG. 5 is a flowchart showing one example of an operation of a base station according to an example embodiment.

Each decoder 480 receives the corresponding LLR vector and performs error correction decoding, thereby generating a decoded bit sequence (step 503 in FIG. 5). Each decoder 480 may be, for example but not limited to, an LDPC decoder. Each decoder 480 may perform decoding for any other type of error correcting code, such as RS codes, convolutional codes, or Turbo codes.

The BP detector 400 uses a learned parameter set 450 in the BP algorithm (step 501 in FIG. 5). The parameter set 450 may be stored in the memory 305 of the base station 1. Techniques for improving the performance of signal processing with a BP algorithm include damping, scaling, and node selection. For example, the learned parameter set 450 may include one or any combination of a plurality of scaling factors, a plurality of damping factors, and a plurality of node selection factors.

In one example, the learned parameter set 450 includes a plurality of scaling factors and a plurality of damping factors. The BP detector 400 uses these scaling factors in different respective iterations of the BP algorithm. Likewise, the BP detector 400 uses these multiple damping factors in different respective iterations of the BP algorithm. Accordingly, the total number of scaling factors and the total number of damping factors may each be equal to the total number of iterations of the BP algorithm.

In another example, the learned parameter set 450 includes a plurality of scaling factors and a plurality of node selection factors. The BP detector 400 uses these multiple scaling factors in different iterations of the BP algorithm. Likewise, the BP detector 400 uses these multiple node selection factors in different iterations of the BP algorithm. As will be described later, the BP algorithm may use a plurality of node selection factors per iteration. In this case, the parameter set 4550 may include a set of node selection factors per iteration.

In the damping, a weighted average of beliefs generated in a previous iteration and the current iteration is used as a new belief, thereby suppressing belief oscillations that cause poor convergence. A damping factor defines a weighting factor (or coefficient) of the weighted average. Meanwhile, the scaling takes into account that the reliability of beliefs in early iterations is relatively low, and accordingly uses a parameter (i.e., scaling factor) for adjusting the absolute values of the beliefs so that they become gradually larger as the number of iterations increases. In the case of MIMO detection, the node selection is used as a countermeasure against fading spatial correlations. Specifically, in the node selection, a set of receiving antenna elements is divided into a plurality of subsets. Each subset is composed of receiving antenna elements spatially separated from each other (i.e., having lower correlations). A BP algorithm with node selection updates only the beliefs of one subset in one BP iteration and sequentially updates the beliefs of the other subsets in subsequent BP iterations.

The parameter set 450 is produced by training the network (or graph), which is obtained by unfolding the iterative BP algorithm of the BP detector 400, using a machine learning technique. This machine learning technique uses a loss function that takes into account the non-Gaussianity (or non-Gaussian nature) of an LLR distribution calculated from the output of the network. The non-Gaussianity of the LLR distribution represents the deviation of the LLR distribution from the Gaussian distribution. In other words, the magnitude of the non-Gaussianity of the LLR distribution represents how much the LLR distribution deviates from the Gaussian distribution. The loss function may be defined to include a term representing the kurtosis or negentropy of the LLR distribution in order to measure the non-Gaussianity of the LLR distribution. In other words, the loss function may include a term representing a kurtosis metric or negentropy metric of the LLR distribution.

Kurtosis measures the degree of peakedness of a distribution, which is zero only for the Gaussian distribution. The kurtosis of any other distribution is positive if it is super-Gaussian (i.e., spikier than the Gaussian distribution) or is negative if it is sub-Gaussian (i.e., flatter than the Gaussian distribution). Negentropy is also referred to as (normalized) differential entropy. The negentropy of a distribution is defined as the value obtained by subtracting the entropy of the distribution from the entropy of Gaussian with the same variance as that distribution. An important feature of the Gaussian distribution is that it has the largest entropy of all distributions over the entire real axis. Since the negentropy is always greater than zero unless the distribution is Gaussian, it can be used to measure the non-Gaussianity of a distribution.

As is known in the field of independent component analysis, the negentropy J of a distribution x can be approximated as follows:

$$J(x) \approx \frac{1}{12}E\{x^3\}^2 + \frac{1}{48}\text{kurt}(x) \quad (8)$$

where E{ } represents the averaging operation and kurt Q represents the kurtosis function. The kurtosis function is defined as follows:

$$\text{kurt}(x) = E\{x^4\} - 3E\{x^2\}^2 \quad (9)$$

If the distribution x is normalized so that it has zero mean and unit variance, then the kurtosis function of the distribution x is expressed as:

$$\text{kurt}(x) = E\{x^4\} - 3 \quad (10)$$

Alternatively, the negentropy J of the distribution x, normalized to have zero mean and unit variance, may be approximated as follows:

$$J(x) \approx k_1\left(E\left\{x \exp\left[-\frac{x^2}{2}\right]\right\}\right)^2 + k_2\left(E\left\{\exp\left[-\frac{x^2}{2}\right]\right\} - \frac{1}{\sqrt{2}}\right)^2 \quad (11)$$

$$k_1 = \frac{36}{8\sqrt{3} - 9} \quad (12)$$

$$k_2 = \frac{24}{16\sqrt{3} - 27} \quad (13)$$

In the training process to obtain the parameter set 450, the LLR distribution calculated from the output of the network may be normalized so that it has zero mean and unit variance. The parameters in the network may then be adjusted to minimize a loss function that includes a term representing a negentropy metric (or kurtosis metric) of the normalized LLR distribution. It is known that in order to maximize the error correction capability, the mean and variance values of the LLR distribution must satisfy a consistency condition of 1:2. Using this, the variance of the LLR distribution may be calculated by doubling the mean value of the LLR distribution.

By using the learned parameter set 450 described above, the demodulator 470 can make the LLR output (i.e., the output of the LLR generator 460) after the demodulation process closer to the Gaussian distribution. In other words, the demodulator 470 can make the distribution of the LLRs to be input to the subsequent decoding process (or the second decoding process) closer to the Gaussian distribution, and thus can provide the respective decoders 480 with LLRs that are suitable for error correction decoding. As a result, the receiver 10 of this example embodiment can improve the BER of the decoder output.

In the following, several examples of the loss function used in learning the parameter set 450 will be described. In a first example, the loss function may be defined as follows:

$$\text{Loss} = J_0 + J_1 \quad (14)$$

where $J_0$ is the negentropy of the LLR distribution corresponding to bit 0 and $J_1$ is the negentropy of the LLR distribution corresponding to bit 1. However, while this loss function contributes to bringing the LLR distribution closer to Gaussian, this may increase the error from the true value (i.e., the transmitted signal). To avoid this problem, the loss function may be defined to further take into account the difference between the output of the network and the training data (or the true value), as shown below.

In a second example, the loss function may be defined as a weighted sum of a first term representing a negentropy metric of the LLR distribution and a second term representing an MSE metric between the output of the network and the training data. Specifically, the loss function may be defined as follows:

$$\text{Loss} = w1(J_0 + J_1) + (1 - w1)L_{MSE} \quad (15)$$

where $L_{MSE}$ is the MSE between the output of the network and the training data (i.e., true value), and w1 is a weight value between 0 and 1.

In a third example, the loss function may be defined as a weighted sum of a first term representing a negentropy metric of the LLR distribution and a second term representing a cross-entropy metric between the output of the network and the training data. Specifically, the loss function may be defined as follows:

$$\text{Loss} = w2(J_0 + J_1) + (1 - w2)L_{BCE} \quad (16)$$

where $L_{BCE}$ is the BCE between the output of the network and the teacher data (i.e., true value), and w2 is a weight value between 0 and 1.

The loss functions in the second and third examples above contribute to determining the parameter set 450 in such a way as to keep the LLR distribution close to the Gaussian distribution while maintaining a small error from the true value (i.e., the transmitted signal).

Figure 6:
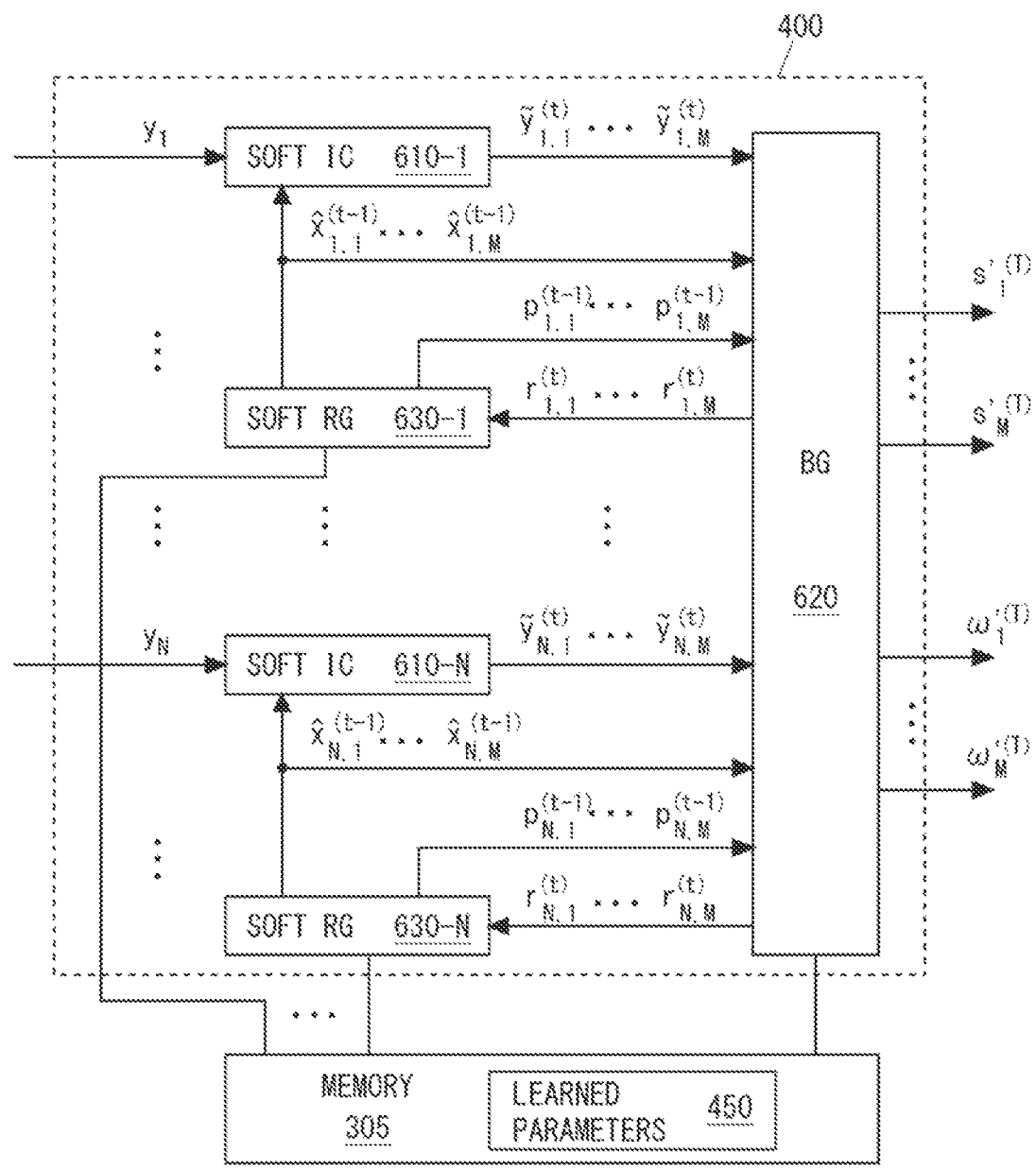
FIG. 6 is a diagram showing a configuration example of a demodulator according to an example embodiment.

The following provides a description of a configuration example of the BP detector 400. FIG. 6 shows a configuration example of the BP detector 400. Referring to FIG. 6, the BP detector 400 includes N soft interference cancellers 610-1 to 610-N, a belief generator 620, and N soft replica generators 630-1 to 630-N. The soft interference cancellers 610-1 to 610-N respectively receive the N received signals $y_1$-$y_N$ obtained by the N receiving antennas. The soft interference canceller 610-1 receives, for example, the received signal $y_1$ of a first antenna (this signal is referred to as a first received signal). In addition, in order to perform the t-th iteration, the soft interference canceller 610-1 receives soft replicas x hat $_{1,1}^{(t-1)}$ to x hat $_{1,M}^{(t-1)}$ of all the transmitted signals generated in the previous (t−1)-th iteration. Here, x hat means the letter x with circumflex (^). The soft interference canceller 610-1 then generates post-cancellation received signals y tilde $_{1,1}^{(t)}$ to y tilde $_{1,M}^{(t)}$. Here, y tilde means the letter y with a tilde (~) above.

The belief generator 620 reads the damping factors (or the sets of node selection factors) included in the above-described trained parameter set from the memory 305. The belief generator 620 receives the post-cancellation received signals y tilde $_{1,1}^{(t)}$ to y tilde $_{1,M}^{(t)}$ from the soft interference canceller 610-1. The belief generator 620 also receives post-cancellation received signals y tilde $_{n,1}^{(t)}$ to y tilde $_{n,M}^{(t)}$ similarly generated by each of the remaining soft interference cancellers 610-n (where n is between 2 and N). The belief generator 620 then generates beliefs $r_{1,1}^{(t)}$ to $r_{1,M}^{(t)}$ associated with the first received signal using the damping factor (or the set of node selection factors) for the t-th iteration. Likewise, the belief generator 620 generates beliefs associated with each of the remaining second to n-th received signals.

The soft replica generator 630-1 reads the scaling factors included in the above-described trained parameter set from the memory 305. The soft replica generator 630-1 receives the beliefs $r_{1,1}^{(t)}$ to $r_{1,M}^{(t)}$ associated with the first received signal from the belief generator 620. The soft replica generator 630-1 then generates soft replicas x hat $_{1,1}^{(t)}$ to x hat $_{1,M}^{(t)}$ and further generates soft replica's power $p_{1,1}^{(t)}$ to $p_{1,M}^{(t)}$, using the scaling factor for the t-th iteration.

After the completion of the BP processing with the total number of iterations T, the belief generator 620 provides the LLR generator 460 with estimated values $s'_1^{(T)}$ to $s'_M^{(T)}$ of the separated M transmitted signal (transmitted symbol) components and equivalent gains $\omega'_1^{(T)}$ to $\omega'_M^{(T)}$.

The following describes in more detail the processing performed by the soft interference canceller 610, the belief generator 620, and the soft replica generator 630. In addition, the processing performed by the LLR generator 460 will be described.

(1) Soft Interference Canceller

In the first iteration, soft replicas have not yet been generated. The soft interference canceller 610 thus supplies the first to N-th received signals to the belief generator 620 without performing cancellation processing. In the t-th iteration, which is the second or any subsequent iteration, the soft interference canceller 610-n associated with the n-th received signal cancels M−1 transmitted signal components other than the m-th transmitted signal from the n-th received signal and generates the post-cancellation received signal y tilde $_{n,m}^{(t)}$. The post-cancellation received signal y tilde $_{n,m}^{(t)}$ is given by the following equation:

$$\tilde{y}_{n,m}^{(t)} = y_n - \sum_{\substack{j=1 \\ j \neq m}}^{M} h_{n,j} \hat{x}_{n,j}^{(t-1)} \quad (17)$$

where $y_n$ is the received signal of the n-th receiving antenna, $h_{n,j}$ is a channel response between the j-th transmitting antenna and the n-th receiving antenna, and x hat $_{n,j}^{(t-1)}$ is a soft replica of the transmitted signal of the j-th transmitting antenna obtained in the (t−1)-th iteration processing. As described above, the base station 1 is able to estimate the channel response using the reference signal transmitted from the radio terminal 2. The post-cancellation received signal y tilde $_{n,m}^{(t)}$ is supplied to the belief generator 620.

(2) Belief Generator

The belief generator 620 generates beliefs using the post-cancellation received signals. First, the belief generator 620 performs processing expressed by the following equation using the post-cancellation received signal y tilde $_{n,m}^{(t)}$ regarding the n-th receiving antenna, thereby obtaining a transmitted signal component $s_{n,m}^{(t)}$ in the t-th iteration:

$$s_{n,m}^{(t)} = \frac{h_{n,m} \tilde{y}_{n,m}^{(t)}}{\psi_{n,m}^{(t)}} \quad (18)$$

where $\omega_{n,m}^{(t)}$ is a residual interference and noise power. The residual interference and noise power $\omega_{n,m}^{(t)}$ is obtained by the following equations:

$$\psi_{n,m}^{(t)} = \sum_{\substack{j=1 \\ j \neq m}}^{M} h_{n,j}^2 \delta_{n,j}^{(t)} + \frac{N_0}{2} \quad (19)$$

$$\delta_{n,j}^{(t)} = p_{n,j}^{(t-1)} - (\hat{x}_{n,j}^{(t-1)})^2 \quad (20)$$

where $p_{n,j}^{(t-1)}$ is the power of the soft replica. As described above, the soft replica's power is generated by the soft replica generator 630.

The equivalent gain $\omega_{n,m}^{(t)}$ to the true transmitted signal $x_m$ included in the transmitted signal component $s_{n,m}^{(t)}$ is used for normalization in the scaling processing and is given by the following equation:

$$\omega_{n,m}^{(t)} = \frac{h_{n,m}^2}{\psi_{n,m}^{(t)}} \quad (21)$$

Next, the belief generator 620 generates a belief $r_{n,m}^{(t)}$ using the transmitted signal component $s_{n,m}^{(t)}$. The belief generator 620 uses either the damping processing or the node selection processing. The damping processing calculates the weighted average of the transmitted signal component obtained in the previous (t−1)-th iteration and the transmitted signal component obtained in the current t-th iteration by using the damping factor $\eta^{(t)}$ as follows:

$$s'^{(t)}_{n,m} = \eta^{(t)} \sum_{\substack{i=1 \\ i \neq n}}^{N} s_{i,m}^{(t)} + (1 - \eta^{(t)}) s'^{(t-1)}_{n,m} \quad (22)$$

where $s'_{n,m}^{(t)}$ is a transmitted signal component after the damping processing. As a result of this damping processing, the equivalent gain included in $s'_{n,m}^{(t)}$ is given by the following equation:

$$\omega'^{(t)}_{n,m} = \eta^{(t)} \sum_{\substack{i=1 \\ i \neq n}}^{N} \omega_{i,m}^{(t)} + (1 - \eta^{(t)}) \omega'^{(t-1)}_{n,m} \quad (23)$$

On the other hand, in the node selection, $s'_{n,m}^{(t)}$ is calculated by synthesizing the transmitted signal components of the antennas obtained in the latest K iterations, which is given by the following equation:

$$s'^{(t)}_{n,m} = \sum_{k=0}^{K-1} \sum_{\substack{i=1 \\ i \neq n}}^{N} \eta_{i,t-k}^{(t)} s_{i,m}^{(t-k)}, \text{ s.t.} \sum_{k=0}^{K-1} \eta_{i,t-k}^{(t)} = 1 \quad (24)$$

where $\eta_{i,t-k}^{(t)}$ is a node selection factor indicating how much the transmitted signal component $s_{i,m}^{(t-k)}$ is considered in the t-th iteration. In the existing node selection method, the value of the node selection factor $\eta_{i,t-k}^{(t)}$ is either 0 or 1, which means that it is alternatively determined whether or not to take the node i (i.e., observation node, receiving antenna) into account. On the other hand, in this example embodiment, the node selection factor $\eta_{i,t-k}^{(t)}$ is a real number value between 0 and 1 (or a real number value not less than 0 and not greater than 1). Accordingly, the node selection factor $\eta_{i,t-k}^{(t)}$ of this example embodiment is able to finely adjust how much the transmitted signal component $s_{i,m}^{(t-k)}$ of the node i is considered in the t-th iteration. Besides, the node selection factor $\eta_{i,t-k}^{(t)}$ of this example embodiment is learnable (or trainable) in deep learning, as will be described later. When K=t in the above expression, the transmitted signal components obtained in all the past iterations are used in the node selection.

As a result of the node selection processing, the equivalent gain included in $s'_{n,m}^{(t)}$ is given by the following equation:

$$\omega'^{(t)}_{n,m} = \sum_{k=0}^{K-1} \sum_{\substack{i=1 \\ i \neq n}}^{N} \eta_{i,t-k}^{(t)} \omega_{i,m}^{(t)} \qquad (25)$$

The belief generator 620 normalizes $s'_{n,m}^{(t)}$ obtained by either the damping or the node selection with $\omega'_{n,m}^{(t)}$, thereby generating a normalized belief $r_{n,m}^{(t)}$. The belief generator 620 supplies the normalized belief to the soft replica generator 630. The normalized belief $r_{n,m}^{(t)}$ is expressed by the following equation:

$$r_{n,m}^{(t)} = \frac{s'^{(t)}_{n,m}}{\omega'^{(t)}_{n,m}} \qquad (26)$$

(3) Soft Replica Generator

The soft replica generator 630 scales the belief $r_{n,m}^{(t)}$ with a scaling factor am and calculates the soft replica x hat $_{n,m}^{(t)}$ and soft replica's power $p_{n,m}^{(t)}$ in accordance with the following equations:

$$\hat{x}_{n,m}^{(t)} = c \sum_{s' \in S_{Q'}} \tanh\left(\frac{a^{(t)}}{c}(r_{n,m}^{(t)} - s')\right) \qquad (27)$$

$$p_{n,m}^{(t)} = E_s^{max} + 2c \sum_{s' \in S_{Q'}} s' \tanh\left(\frac{a^{(t)}}{c}(r_{n,m}^{(t)} - s')\right) \qquad (28)$$

where $E_s^{max}$ is the average power of the largest PAM symbol that can be taken and s' is a determination threshold for PAM modulation. The value $E_s^{max}$ is given by the following equation:

$$E_s^{max} = (\sqrt{Q}-1)^2 c^2 \qquad (29)$$

The determination threshold s' can have any value of a set $S_{Q'}$. The set $S_{Q'}$ is {0} for QPSK and {0, +2c, −2c} for 16QAM. The tan h function is a hyperbolic tangent function. These equations indicate that the soft replica x hat $_{n,m}^{(t)}$ and the soft replica's power $p_{n,m}^{(t)}$ are generated by synthesizing belief information around the determination threshold.

(4) Output of BP Detector

After the completion of the T iterations, the belief generator 620 supplies the estimated value $s'^{(T)}_m$ and equivalent gain $\omega'^{(T)}_m$ of each of the M separated transmitted signal components to the LLR generator 460. The estimated value $s'^{(T)}_m$ is expressed by the following equations:

$$s'^{(T)}_m = \sum_{i=1}^{N} s'^{(T)}_{i,m} \qquad (30)$$

$$\omega'^{(T)}_m = \sum_{i=1}^{N} \omega'^{(T)}_{i,m} \qquad (31)$$

(5) LLR Generator

The LLR generator 460 generates M LLR vectors corresponding to the M transmitted symbols. Each LLR vector indicates bit LLR values ($LLR_{m,1} \ldots LLR_{m,B}$) of the code word that is mapped to each transmitted symbol. The generation of LLR vectors is not limited to any particular method, and various already known techniques can be used. In one example, when the transmitted signal $x_m$ consists of B code word bits, $c_m(1), \ldots, c_m(n_s), c_m(B)$, the bit LLR corresponding to the $n_s$-th code word bit, $c_m(n_s)$, may be calculated by the following equation:

$$LLR_{m,n_s} = \ln\left(\frac{\sum_{x_q \in x | c_m(n_s)=1} \exp\left[x_q\left(s'^{(T)}_m - \frac{1}{2}\omega'^{(T)}_m x_q\right)\right]}{\sum_{x_q \in x | c_m(n_s)=0} \exp\left[x_q\left(s'^{(T)}_m - \frac{1}{2}\omega'^{(T)}_m x_q\right)\right]}\right) \qquad (32)$$

The following equation refers to the set of candidate symbol points for which $c_m(n_s)$ has the value b:

$$x | c_m(n_s) = b$$

Note that the above-described formula for calculating the bit LLR is numerically extremely unstable because it involves the sum of exponential operations. Accordingly, when implementing the formula, the logarithm of the sum of the exponential functions may be calculated using the Jacobian logarithm.

Figure 7:
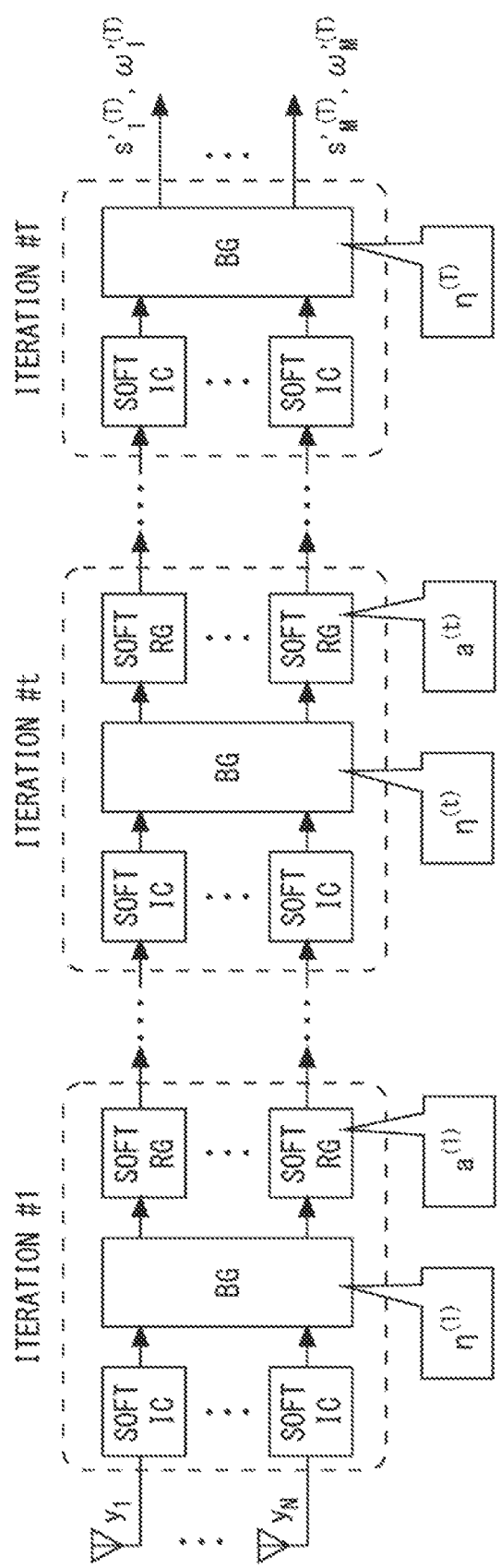
FIG. 7 is a conceptual diagram showing deep unfolding of a BP detector according to an example embodiment.

In the following, the method of learning the parameter set 450 will be explained. FIG. 7 is a conceptual diagram showing deep unfolding for BP-based multi-user detection. In deep unfolding, an iterative algorithm is unfolded in its iterative direction, and the obtained process flow graph is regarded as a Deep Neural Network (DNN), to which a deep learning scheme is applied. Unfolding the BP detector 400 in its iterative direction gives the BP network shown in in FIG. 7. Each BP iteration corresponds to one layer of the DNN. It enables the learning of meta-parameters embedded in the BP network. For example, as shown in FIG. 7, the learnable (or trainable) parameters may include the scaling factor $a^{(t)}$ and the damping factor $\eta^{(t)}$ for each iteration (or each layer). Alternatively, the learnable (or trainable) parameters may include the scaling factor $a^{(t)}$ and the set $\{\eta_{i,t-k}^{(t)}\}$ of node selection factors for each iteration (or each layer). The training may be based on a gradient method, and the meta-parameters may be adjusted together in the direction in which a loss function becomes smaller. As already explained, this loss function takes into account the non-Gaussianity of the LLR distribution computed from the output of the network (i.e., BP network). This allows the meta-parameters to be adjusted to reduce the non-Gaussianity of the LLR distribution. The loss function may also take into account the difference between the output of the network and the training data (i.e., the true value). The loss function may be defined as a weighted sum of a first term representing a negentropy metric of the LLR distribution and a second term representing an MSE (or BCE) metric between the output of the network and the training data.

FIG. 8 shows an example of the parameter set 450 produced by deep learning. In the example of FIG. 8, the parameter set is determined per Modulation and Coding Scheme (MCS). For example, as is known for Long Term Evolution (LTE), LTE-Advanced, and 5G systems, different MCS numbers are associated with different combinations of modulation scheme (or modulation order) and code rate.

Training for each MCS is performed to obtain the multiple parameter sets shown in FIG. 8. The trainings for different MCSs may use different loss functions from each other. For example, the magnitude of the weight value w1 or w2 of the objective function defined in equation (15) or (16) above may be changed depending on the code rate of the error correcting code. Specifically, when the code rate is relatively low, i.e., when the error correction capability of the decoder is relatively powerful, the weight value may be determined in such a way that the loss function preferentially considers the negentropy metric of the LLR distribution. In contrast, when the code rate is relatively high, i.e., when the error correction capability of the decoder is relatively poor, the weight value may be determined in such a way that the loss function preferentially considers the MSE (or BCE) metric. In other words, as the code rate increases, the weight value may be changed to increase the weighting of the MSE (or BCE) metric while decreasing the weighting of the negentropy metric of the LLR distribution. As a result, the parameter set is adjusted to emphasize the decoding process when the error correction capability is strong, whereas the parameter set is adjusted to emphasize the demodulation process when the error correction capability is poor. This allows the bit error rate characteristics to be improved at each code rate.

Additionally or alternatively, the magnitude of the weight w1 or w2 of the objective function defined in equation (15) or (16) above may be changed depending on the modulation scheme or modulation order. Specifically, when the modulation order is relatively large, i.e., when the LLR of the demodulator output has lower Gaussianity, the weight value may be determined in such a way that the loss function preferentially considers the negentropy metric of the LLR distribution. In contrast, when the modulation order is relatively small, i.e., when the LLR of the modulator output has higher Gaussianity, the weight value may be determined in such a way that the loss function preferentially considers the MSE (or BCE) metric. In other words, as the modulation order decreases, the weighting values may be changed to increase the weighting of the MSE (or BCE) metric while decreasing the weighting of the negentropy metric of the LLR distribution. In this way, when the modulation order is large and the Gaussianity of the LLR distribution is low, the error correction capability can be enhanced by bringing the LLR distribution closer to the Gaussian distribution. On the contrary, when the modulation order is small and the Gaussianity of the LLR distribution of the demodulator output is high, the parameter set is adjusted to emphasize the demodulation process. This can improve the bit error rate characteristics when each modulation method is employed.

In one example, training with a first loss function may be performed to obtain a first set of parameters, and training with a second loss function may be performed to obtain a second set of parameters. The second loss function is defined to take into account the non-Gaussianity of the LLR distribution more deeply than the first loss function. The first and second loss functions may be distinguished by the difference in the weight values w1 or w2 of the function defined in equation (15) or (16) above. The first set of parameters is used when the code rate is a first value or when the modulation order is a second value. On the other hand, the second set of parameters is used when the coding rate is lower than the first value or when the modulation order is greater than the second value.

Additionally or alternatively, multiple trainings may be performed to obtain multiple sets of parameters that correspond to different signal to noise power ratios (SNRs) from each other. The trainings for different SNRs may use different loss functions from each other. For example, the magnitude of the weight w1 or w2 of the objective function defined in equation (15) or (16) above may be changed depending on the SNR. Specifically, when the SNR is relatively small, the weight value may be determined in such a way that the loss function preferentially considers the negentropy metric of the LLR distribution, since the accuracy of the demodulator output is lower and the effect of the error correction capability of the demodulator is relatively larger. In contrast, when the SNR is larger, the weight value may be determined in such a way that the loss function preferentially considers the MSE (or BCE) metric, since the accuracy of the demodulator output is higher. In other words, as the SNR increases, the weight value may be changed to increase the weighting of the MSE (or BCE) metric while decreasing the weighting of the negentropy metric of the LLR distribution. In this way, when the SNR is lower and the accuracy of the demodulator output is lower, the error correction capability can be enhanced by bringing the LLR distribution closer to the Gaussian distribution. Conversely, when the SNR is higher, the parameter set is adjusted to emphasize the demodulation process. This can improve the bit error rate characteristics at various SNRs.

In one example, training with a first loss function may be performed to obtain a first set of parameters, and training with a third loss function may be performed to obtain a third set of parameters. The third loss function is defined to take into account the non-Gaussianity of the LLR distribution more deeply than the first loss function. The first and third loss functions may be distinguished by the difference in the weight values w1 or w2 of the objective function defined in equations (15) or (16) above. The first set of parameters is used when the SNR is a third value. On the other hand, the third parameter set is used when the SNR is smaller than the third value.

Figure 9:
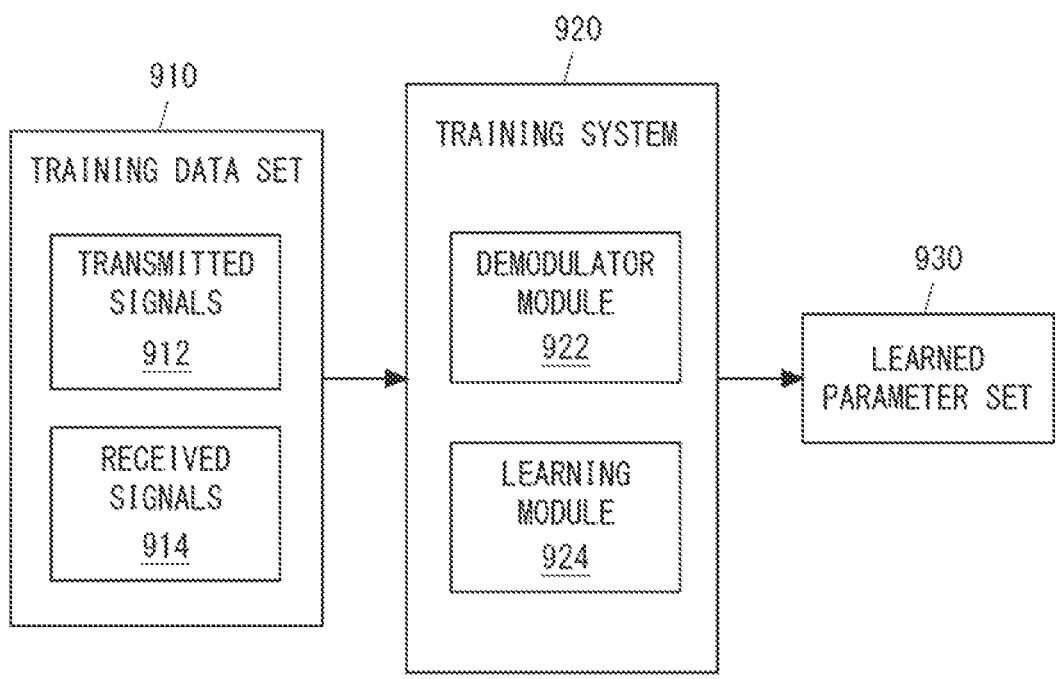
FIG. 9 is a diagram showing a configuration example of a training system according to the example embodiment.

FIG. 9 shows one example of the training system environment. A training data set 910 includes a transmitted signal data set 912 and a received signal data set 914. The transmitted signal data set 912 may be randomly generated. The received signal data set 914 corresponds to the transmitted signal data set 912 and is generated using the transmitted signal data set 912 and a given channel matrix. The channel matrix may be randomly generated or may be generated based on a propagation path model defined in the 3rd Generation Partnership Project (3GPP) specifications or the like. Alternatively, the channel matrix may be generated based on measurement results in the actual environment where the base station 1 is installed.

A training system 920 includes a demodulator module 922 and a learning module 924. The demodulator module 922 emulates the processor 304 or the demodulator 470 of the base station 1. The demodulator module 922 is able to execute a BP algorithm that is the same as the BP algorithm implemented in the base station 1. The learning module 924 trains the demodulator module 922 using the training data set 910. The learning module 924 may apply one or more machine learning algorithms.

The learning module 924 uses the loss function described above, i.e., a loss function that takes into account the non-Gaussianity of the LLR distribution. In one example, the learning module 924 may use an update algorithm, such as a gradient method. The gradient update method to be used may be, for example, an Adaptive moment estimation (Adam) optimizer algorithm. In addition, the learning module 924 may use mini-batch learning. The number of learning iterations may be set to an appropriate value in view the risk of overfitting to the training data. To update the learning rate, a Step algorithm that gradually narrows the update width with respect to the number of learning iterations may be used.

The learning module 924 outputs a learned (or trained) parameter set 930 obtained by machine learning. The parameter set 930 may be stored in the memory 305 of the base station 1 as the parameter set 450.

Figure 10:
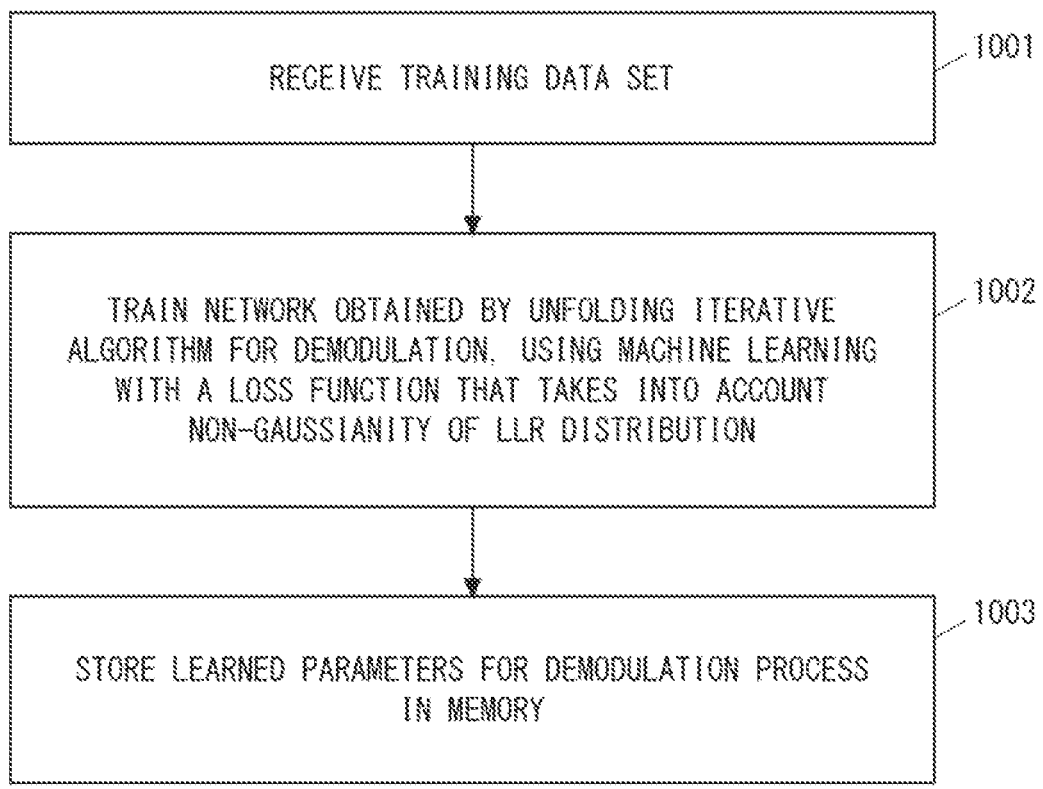
FIG. 10 is a flowchart showing one example of training according to an example embodiment.

FIG. 10 shows one example of an operation of the training system 920. In Step 1001, the training system 920 receives the training data set 910. In Step 1002, the training system 920 trains the network obtained by unfolding an iterative algorithm (e.g., BP algorithm) for demodulation (or demodulation and decoding) by machine learning using a loss function that accounts for the non-Gaussianity of the LLR distribution. In Step 1003, the training system 920 stores a learned (or trained) parameter set in memory.

Figure 11:
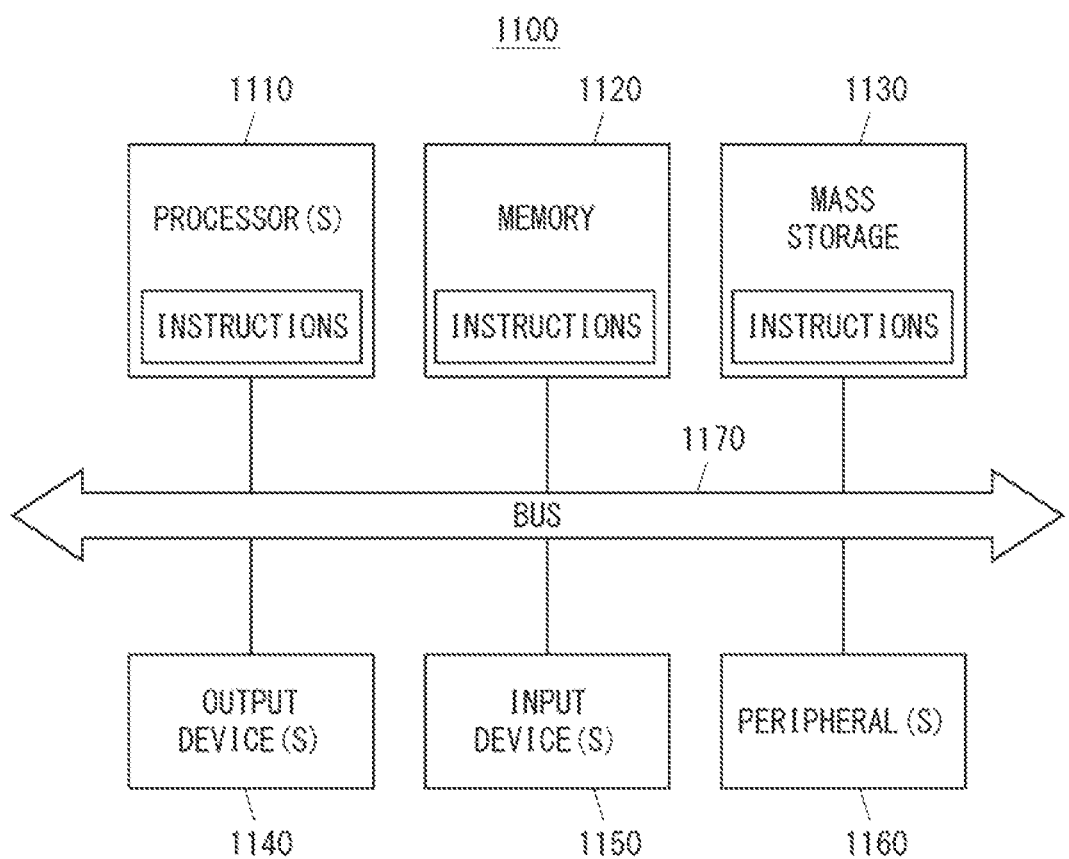
FIG. 11 is a flowchart showing one example of a computer system according to an example embodiment.

The training system 920 may be a computer system as shown in FIG. 11. FIG. 11 shows a configuration example of a computer system 1100. The computer system 1100 is able to execute one or more computer programs including a set of instructions, thereby performing, for example, a method for the training system 920. The training system 920 may be a standalone computer or may include one or more networked computers. The computer system 1100 may be one or both of a server and a client in a server-client environment. The computer system 1100 may be a personal computer, a tablet computer, or a smartphone.

In the example shown in FIG. 11, the computer system 1100 includes one or more processors 1110, a memory 1120, and a mass storage 1130, which communicate with one another via a bus 1170. The one or more processors 1110 may include, for example, one or both of a central processing unit(s) (CPU(s)) and a graphics processing unit(s) (GPU(s)). The computer system 1100 may include other devices, such as one or more output devices 1140, one or more input devices 1150, and one or more peripherals 1160. The one or more output devices 1140 include, for example, a video display and a speaker. The one or more input devices 1150 include, for example, a keyboard, a mouse, a keypad, a touch pad, a touch screen, or any combination thereof. The one or more peripherals 1160 include, for example, a printer, a modem, a network adapter, or any combination thereof.

One or both of the memory 1120 and the mass storage 1130 include a computer readable medium storing one or more sets of instructions. These instructions may be partially or fully stored in a memory in the processor 1110. These instructions, when executed on the processor 1110, cause the processor 1110 to perform, for example, the machine learning process described with reference to FIG. 10.

As described above, in some implementations, the processor 304 included in the base station 1 executes one or more programs including instructions for causing a computer to execute the algorithm described in this example embodiment. In addition, the training system 920 executes one or more programs including instructions for causing a computer to execute machine learning described in this example embodiment. Each of these programs can be stored in any type of non-transitory computer readable media and can be provided to a computer. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). Each of the programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 12:
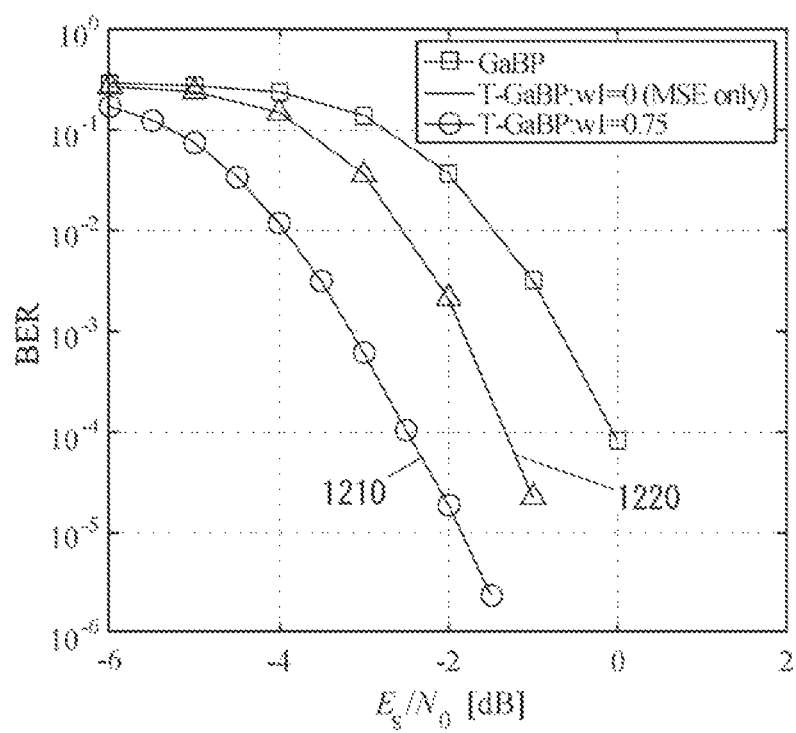
FIG. 12 is a diagram showing a bit error rate performance of a receiver according to an example embodiment.

FIG. 12 shows the Bit Error Rate (BER) performance of the receiver (i.e., demodulator 470 and decoder 480) of the present example embodiment. These are simulation results for a multi-user MIMO configuration with (N', M')=(32, 32), where the number of terminals is denoted by M' and the number of receiving antenna elements is denoted by N'. In addition, the error correction code is LDPC code (code ratio=⅓, code length=1024 bits), and the modulation scheme is 16QAM. The graph 1210 shows the BER of the receiver with a parameter set obtained using the loss function of equation (15) that considers the negentropy metric with the weight value w1=0.75. On the other hand, the graph 1220 shows the BER of the receiver with a parameter set obtained using the loss function that considers only the MSE metric (i.e., weight value w1=0). Comparing these two graphs, it can be seen that training with the loss function that considers the negentropy metric results in a gain of more than 1 dB at a bit error rate of $10^{-3}$.

Second Example Embodiment

This example embodiment provides a modified example of training of a parameter set described in the first example embodiment. A configuration example of the radio communication system and base station for this example embodiment is similar to those of the first example embodiment.

In the present example embodiment, the receiver 10 (i.e., demodulator 470 and BP detector 400) of the base station 1 uses a second parameter set for the demodulation process in retransmission, which is different from the first parameter set used for the demodulation process in initial transmission. Like the first parameter set, the second parameter set is obtained by training the network, which is obtained by deploying the iterative algorithm for demodulation (or demodulation and decoding), using a machine learning technique. However, the second loss function used for training the second parameter set is different from the first loss function used for training the first parameter set. The second loss function is defined to take into account the non-Gaussianity of the LLR distribution of the demodulator output more deeply than the first loss function.

When a bit error is detected in the decoder output, the receiver 10 can request the transmitter 20 for retransmission. For example, the receiver 10 can synthesize the LLR of the first transmission and the LLR of the retransmission using hybrid automatic repeat request (HARQ). The use of synthesized LLR results in improved error correction capability. Accordingly, it is better if the second loss function has a larger weight of the negentropy metric of the LLR distribution than the first loss function. This will adjust the parameter set to emphasize the decoding process in retransmission, where the error correction capability is stronger. This can contribute to improving the bit error rate characteristics.

Other Example Embodiments

As already described, the above example embodiments may be applied to other receivers, implementing machine learning-based iterative demodulation algorithms, that are different from radio receivers for multi-user MIMO.

The configuration of the demodulator 470 described in the above embodiments is an example, and various variations are possible. For example, the BP detector 410 may include an LLR generator within the iterative process. In this case, the belief generator 620 of the BP detector 410 may output an LLR. A de-interleaver may be placed between the demodulator 470 and the decoder 480.

An example advantage according to the above-described example embodiments is to contribute to improving a bit error rate of a decoder output of a receiver implementing a machine learning-based iterative demodulation algorithm.

The above-described example embodiment is merely examples of the application of the technical ideas obtained by the inventors. These technical ideas are not limited to the above-described embodiment and various modifications can be made thereto.

The whole or part of the example embodiments disclosed above can be described as, but not limited to, the following supplementary notes.

(Supplementary Note 1)
A method implemented in a computer system, the method comprising:
training a network, which is obtained by unfolding an iterative algorithm for demodulation or demodulation and decoding, using a machine learning technique with a first loss function that takes into account non-Gaussianity of a log likelihood ratio (LLR) distribution calculated from an output of the network; and
producing, by the training, a first set of learned parameters of the iterative algorithm.

(Supplementary Note 2)
The method according to Supplementary Note 1, wherein the first loss function is defined to include a term representing negentropy or kurtosis of the LLR distribution to measure the non-Gaussianity of the LLR distribution.

(Supplementary Note 3)
The method according to Supplementary Note 1, wherein the first loss function is defined to further take into account a difference between training data and the output of the network.

(Supplementary Note 4)
The method according to Supplementary Note 3, wherein the first loss function is defined as a weighted sum of a term representing the negentropy of the LLR distribution and a term representing a mean squared error between the training data and the output of the network.

(Supplementary Note 5)
The method according to Supplementary Note 3, wherein the first loss function is defined as a weighted sum of a term representing the negentropy of the LLR distribution and a term representing cross entropy between the training data and the output of the network.

(Supplementary Note 6)
The method according to Supplementary Note 1, wherein the iterative algorithm is an iterative Belief Propagation (BP) algorithm, and the first set of learned parameters includes one or any combination of a plurality of scaling factors, a plurality of damping factors, and a plurality of node selection factors.

(Supplementary Note 7)
The method according to Supplementary Note 1, further comprising producing a second set of learned parameters of the iterative algorithm by training the network using a machine learning technique with a second loss function, wherein
the second loss function is defined to take into account the non-Gaussianity of the LLR distribution more deeply than the first loss function,
the first set is used when a code rate is a first value or when a modulation order is a second value, and
the second set is used when the code rate is lower than the first value or when the modulation order is higher than the second value.

(Supplementary Note 8)
The method according to Supplementary Note 1, further comprising producing a third set of learned parameters of the iterative algorithm by training the network using a machine learning technique with a third loss function, wherein
the third loss function is defined to take into account the non-Gaussianity of the LLR distribution more deeply than the first loss function,
the first set is used when a signal to noise power ratio (SNR) is a third value, and
the third set is used when the SNR is less than the third value.

(Supplementary Note 9)
The method according to Supplementary Note 1, further comprising producing a fourth set of learned parameters of the iterative algorithm by training the network using a machine learning technique with a fourth loss function, wherein
the fourth loss function is defined to take into account the non-Gaussianity of the LLR distribution more deeply than the first loss function,
the first set is used for demodulation process on initial transmission, and
the fourth set is used for demodulation process on retransmission.

(Supplementary Note 10)
A non-transitory computer readable medium storing a program including instructions that, when loaded into a computer system, cause the computer system to perform a method comprising:
training a network, which is obtained by unfolding an iterative algorithm for demodulation or demodulation and decoding, using a machine learning technique with a first loss function that takes into account non-Gaussianity of a log likelihood ratio (LLR) distribution calculated from an output of the network;
and producing, by the training, a first set of learned parameters of the iterative algorithm.

(Supplementary Note 11)
A receiver apparatus comprising:
a memory storing one or more sets of learned parameters produced by a method as claimed in any one of Supplementary Notes 1 to 9; and
at least one processor coupled to the memory and configured to:
perform on a plurality of received signals an iterative algorithm that uses any of the one or more sets of learned parameters, and generate a plurality of log likelihood ratio (LLR) vectors corresponding to a plurality of transmitted symbols; and perform error correction decoding using the plurality of LLR vectors to generate a plurality of decoded bit sequences.

(Supplementary Note 12)

A receiver apparatus comprising:
a memory; and
at least one processor coupled to the memory and configured to:
perform on a plurality of received signals an iterative algorithm that uses a first set of learned parameters, and generate a plurality of log likelihood ratio (LLR) vectors corresponding to a plurality of transmitted symbols; and
perform error correction decoding using the plurality of LLR vectors to generate a plurality of decoded bit sequences,
wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

(Supplementary Note 13)

The receiver apparatus according to Supplementary Note 12, wherein the at least one processor is configured to select between the first set and a second set of learned parameters for use in the iterative algorithm, depending on one or both of a modulation order and a code rate.

(Supplementary Note 14)

The receiver apparatus according to Supplementary Note 13, wherein
the second set is generated by training the network using a machine learning technique with a second loss function;
the second loss function is defined to take into account the non-Gaussianity of the LLR distribution more deeply than the first loss function,
the first set is used when the code rate is a first value or when the modulation order is a second value, and
the second set is used when the code rate is lower than the first value or when the modulation order is higher than the second value.

(Supplementary Note 15)

The receiver apparatus according to Supplementary Note 12, wherein the at least one processor is configured to select between the first set and a second set of learned parameters for use in the iterative algorithm, depending on a signal to noise power ratio (SNR).

(Supplementary Note 16)

The receiver apparatus according to Supplementary Note 15, wherein
the third set is generated by training the network using a machine learning technique with a third loss function,
the third loss function is defined to take into account the non-Gaussianity of the LLR distribution more deeply than the first loss function,
the first set is used when the SNR is a third value, and
the third set is used when the SNR is less than the third value.

(Supplementary Note 17)

The receiver apparatus according to Supplementary Note 12, wherein the at least one processor is configured to use the first set for demodulation process on initial transmission and to use a fourth set of learned parameters for demodulation process on retransmission.

(Supplementary Note 18)

The receiver apparatus according to Supplementary Note 17, wherein
the fourth set is generated by training the network using a machine learning technique with a fourth loss function, and
the fourth loss function is defined to take into account the non-Gaussianity of the LLR distribution more deeply than the first loss function.

(Supplementary Note 19)

A method performed by a receiver apparatus, the method comprising:
performing on a plurality of received signals an iterative algorithm that uses a first set of learned parameters, and generating a plurality of log likelihood ratio (LLR) vectors corresponding to a plurality of transmitted symbols; and
performing error correction decoding using the plurality of LLR vectors to generate a plurality of decoded bit sequences,
wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

(Supplementary Note 20)

A program for causing a computer included in a receiver apparatus to perform a method, wherein the method comprises:
performing on a plurality of received signals an iterative algorithm that uses a first set of learned parameters, and generating a plurality of log likelihood ratio (LLR) vectors corresponding to a plurality of transmitted symbols; and
performing error correction decoding using the plurality of LLR vectors to generate a plurality of decoded bit sequences,
wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

The invention claimed is:

1. A method implemented in a computer system, the method comprising:
training a network, which is obtained by unfolding an iterative algorithm for demodulation or demodulation and decoding, using a machine learning technique with a first loss function that takes into account non-Gaussianity of a log likelihood ratio (LLR) distribution calculated from an output of the network; and
producing, by the training, a first set of learned parameters of the iterative algorithm.

2. The method according to claim 1, wherein the first loss function is defined to include a term representing negentropy or kurtosis of the LLR distribution to measure the non-Gaussianity of the LLR distribution.

3. The method according to claim 1, wherein the first loss function is defined to further take into account a difference between training data and the output of the network.

4. The method according to claim 3, wherein the first loss function is defined as a weighted sum of a term representing the negentropy of the LLR distribution and a term representing a mean squared error between the training data and the output of the network.

5. The method according to claim 3, wherein the first loss function is defined as a weighted sum of a term representing the negentropy of the LLR distribution and a term representing cross entropy between the training data and the output of the network.

6. The method according to claim 1, wherein the iterative algorithm is an iterative Belief Propagation (BP) algorithm, and the first set of learned parameters includes one or any combination of a plurality of scaling factors, a plurality of damping factors, and a plurality of node selection factors.

7. The method according to claim 1, further comprising producing a second set of learned parameters of the iterative algorithm by training the network using a machine learning technique with a second loss function, wherein
the second loss function is defined to take into account the non-Gaussianity of the LLR distribution more deeply than the first loss function,
the first set is used when a code rate is a first value or when a modulation order is a second value, and
the second set is used when the code rate is lower than the first value or when the modulation order is higher than the second value.

8. The method according to claim 1, further comprising producing a third set of learned parameters of the iterative algorithm by training the network using a machine learning technique with a third loss function, wherein
the third loss function is defined to take into account the non-Gaussianity of the LLR distribution more deeply than the first loss function,
the first set is used when a signal to noise power ratio (SNR) is a third value, and
the third set is used when the SNR is less than the third value.

9. The method according to claim 1, further comprising producing a fourth set of learned parameters of the iterative algorithm by training the network using a machine learning technique with a fourth loss function, wherein
the fourth loss function is defined to take into account the non-Gaussianity of the LLR distribution more deeply than the first loss function,
the first set is used for demodulation process on initial transmission, and
the fourth set is used for demodulation process on retransmission.

10. A receiver apparatus comprising:
a memory storing one or more sets of learned parameters produced by a method as claimed in claim 1; and
at least one processor configured to:
perform on a plurality of received signals an iterative algorithm that uses any of the one or more sets of learned parameters, and generate a plurality of log likelihood ratio (LLR) vectors corresponding to a plurality of transmitted symbols; and
perform error correction decoding using the plurality of LLR vectors to generate a plurality of decoded bit sequences.

11. A non-transitory computer readable medium storing a program including instructions that, when loaded into a computer system, cause the computer system to perform a method comprising:
training a network, which is obtained by unfolding an iterative algorithm for demodulation or demodulation and decoding, using a machine learning technique with a first loss function that takes into account non-Gaussianity of a log likelihood ratio (LLR) distribution calculated from an output of the network; and
producing, by the training, a first set of learned parameters of the iterative algorithm.

12. A receiver apparatus comprising:
a memory; and
at least one processor coupled to the memory and configured to:
perform on a plurality of received signals an iterative algorithm that uses a first set of learned parameters, and generate a plurality of log likelihood ratio (LLR) vectors corresponding to a plurality of transmitted symbols; and
perform error correction decoding using the plurality of LLR vectors to generate a plurality of decoded bit sequences,
wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

13. The receiver apparatus according to claim 12, wherein the at least one processor is configured to select between the first set and a second set of learned parameters for use in the iterative algorithm, depending on one or both of a modulation order and a code rate.

14. The receiver apparatus according to claim 13, wherein
the second set is generated by training the network using a machine learning technique with a second loss function;
the second loss function is defined to take into account the non-Gaussianity of the LLR distribution more deeply than the first loss function,
the first set is used when the code rate is a first value or when the modulation order is a second value, and
the second set is used when the code rate is lower than the first value or when the modulation order is higher than the second value.

15. The receiver apparatus according to claim 12, wherein the at least one processor is configured to select between the first set and a second set of learned parameters for use in the iterative algorithm, depending on a signal to noise power ratio (SNR).

16. The receiver apparatus according to claim 15, wherein
the third set is generated by training the network using a machine learning technique with a third loss function,
the third loss function is defined to take into account the non-Gaussianity of the LLR distribution more deeply than the first loss function,
the first set is used when the SNR is a third value, and
the third set is used when the SNR is less than the third value.

17. The receiver apparatus according to claim 12, wherein the at least one processor is configured to use the first set for demodulation process on initial transmission and to use a fourth set of learned parameters for demodulation process on retransmission.

18. The receiver apparatus according to claim 17, wherein
the fourth set is generated by training the network using a machine learning technique with a fourth loss function, and
the fourth loss function is defined to take into account the non-Gaussianity of the LLR distribution more deeply than the first loss function.

19. A method performed by a receiver apparatus, the method comprising:
performing on a plurality of received signals an iterative algorithm that uses a first set of learned parameters, and generating a plurality of log likelihood ratio (LLR) vectors corresponding to a plurality of transmitted symbols; and performing error correction decoding using the plurality of LLR vectors to generate a plurality of decoded bit sequences, wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

20. A non-transitory computer readable medium storing a program for causing a computer included in a receiver apparatus to perform a method, wherein the method comprises:

performing on a plurality of received signals an iterative algorithm that uses a first set of learned parameters, and generating a plurality of log likelihood ratio (LLR) vectors corresponding to a plurality of transmitted symbols; and performing error correction decoding using the plurality of LLR vectors to generate a plurality of decoded bit sequences, wherein the first set of learned parameters is a parameter set generated by training a network, which is obtained by unfolding the iterative algorithm, using a machine learning technique with a first loss function that takes into account non-Gaussianity of an LLR distribution calculated from an output of the network.

* * * * *